United States Patent [19]
Farron et al.

[11] 3,711,824
[45] Jan. 16, 1973

[54] METHOD OF PRODUCING UNDERWATER SEISMIC WAVES AND APPARATUS THEREFOR

[75] Inventors: John R. Farron, Mishawaka, Ind.; Andrew A. Seleno, Royal Oak, Mich.; Matthew Slavin, Pasadena, Calif.; Bernard R. Teitelbaum, Birmingham, Mich.

[73] Assignee: United Geophysical Corporation, Pasadena, Calif.

[22] Filed: Jan. 15, 1971

[21] Appl. No.: 106,772

[52] U.S. Cl..........340/7 R, 181/0.5 H, 181/0.5 VM, 340/17
[51] Int. Cl. .........................H04b 13/00, G01v 1/02
[58] Field of Search .......181/0.5 H, 0.5 VM; 340/17, 340/12, 7

[56] References Cited

UNITED STATES PATENTS

| | | |
|---|---|---|
| 3,369,519 | 2/1968 | Bricout..............................181/0.5 H |
| 3,481,426 | 12/1969 | Silverman..........................181/0.5 H |
| 3,322,232 | 5/1967 | Chalmers et al...................181/0.5 H |

*Primary Examiner*—Benjamin A. Borchelt
*Assistant Examiner*—H. A. Birmiel
*Attorney*—Reed C. Lawlor

[57] ABSTRACT

A method of producing seismic waves under water is provided. A seismic wave generator is immersed beneath the surface of the water. A continuously varying predetermined command signal is generated for a period of time to operate a motor. The motor, operated in accordance with the command signal, controls the flow of pressurized fluid from the seismic wave generator into the surrounding water. A continuously varying pressure wave is thereby generated in the surrounding water. Changes in pressure in the surrounding water are detected and a feedback signal is generated in accordance with the changes in pressure. The feedback signal is combined with the command signal to produce a control signal which operates the motor to generate the desired pressure wave in the surrounding water.

24 Claims, 8 Drawing Figures

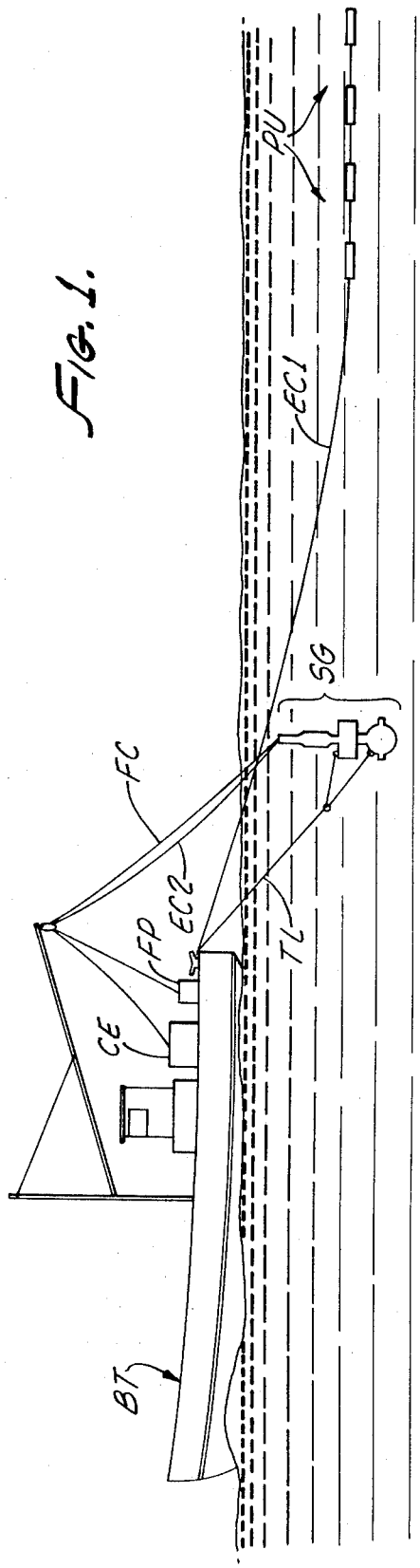
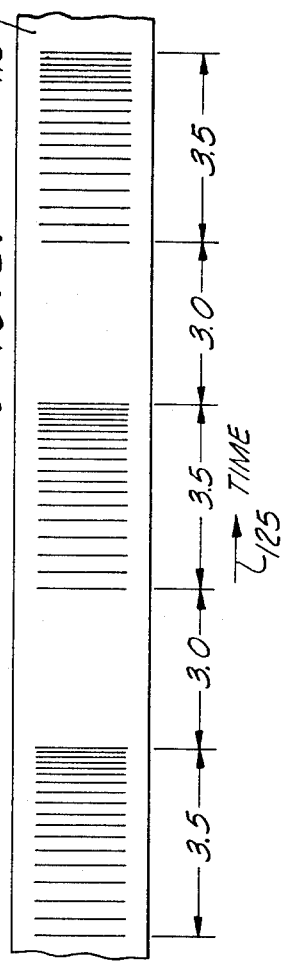
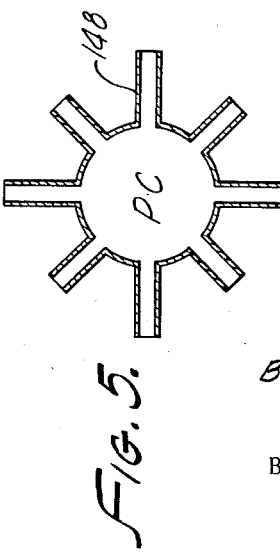

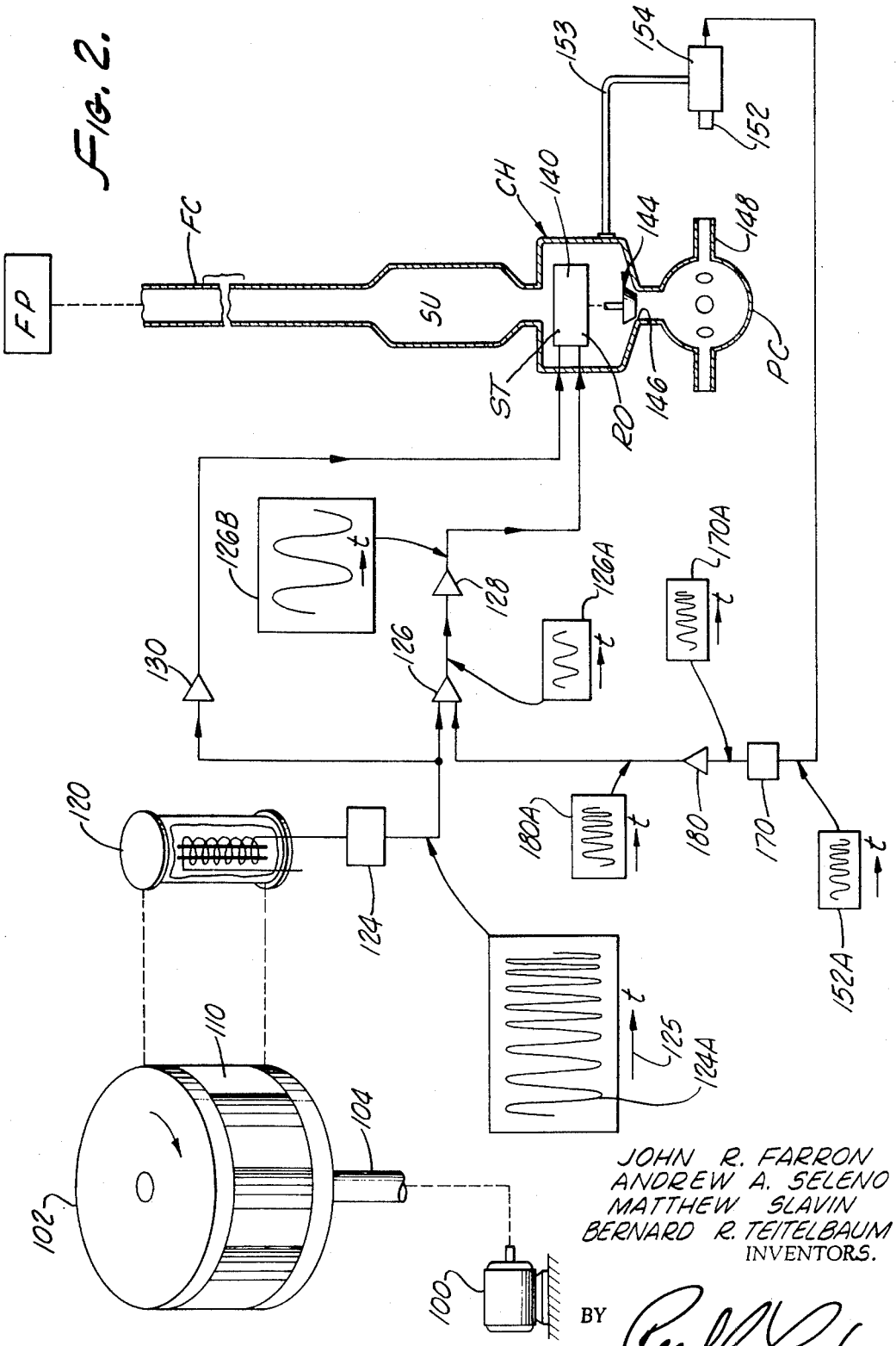

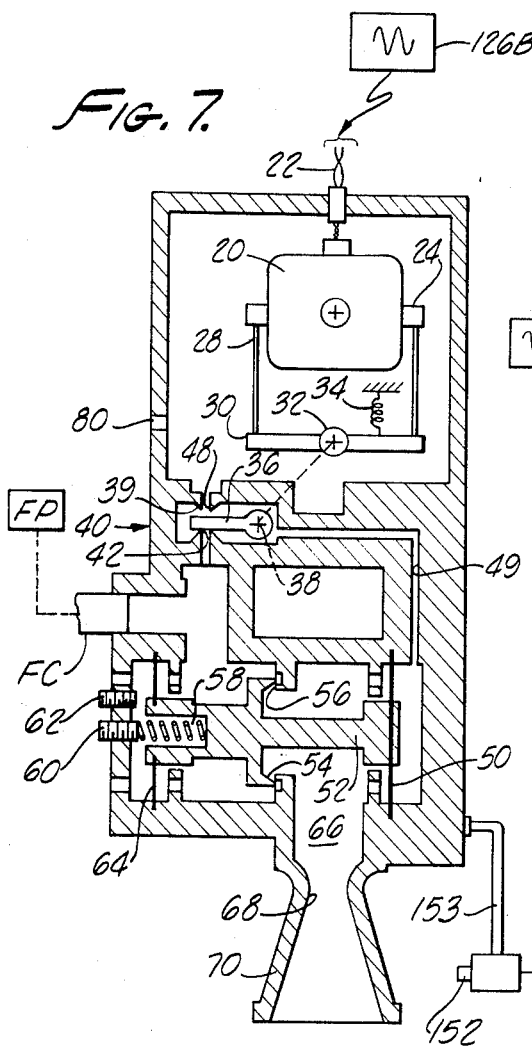
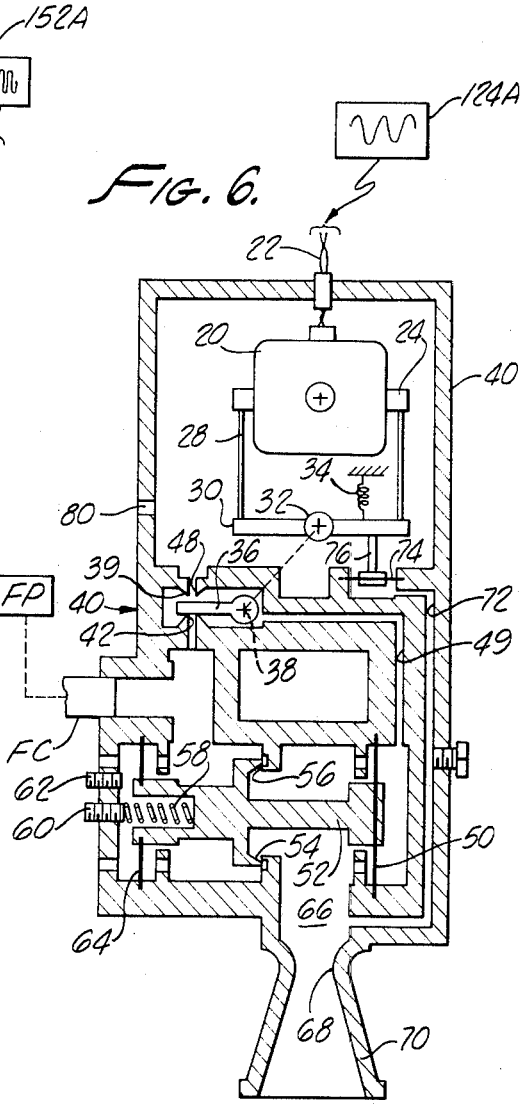
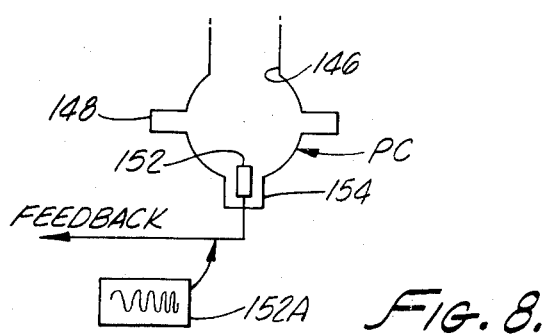

METHOD OF PRODUCING UNDERWATER SEISMIC WAVES AND APPARATUS THEREFOR

BACKGROUND OF THE INVENTION

This invention relates to a method of generating seismic waves under water, and more specifically to a method of generating sesimic waves under water for underwater seismic exploration, and to an apparatus for use in carrying out the method.

The most popular methods currently employed for generating underwater seismic waves utilize explosions, the release of highly pressurized air from a pneumatic source, an underwater electrical discharge which creates an expanding bubble of ionized gas, or the sudden movement of a flexible or rigid member against the water. Typically, each of the devices employed in these methods is capable of creating only one form of pressure wave in the water. Also, a substantial time delay is incurred before such a device can again be used to create another similar pressure wave.

For example, when dynamite is used as the source of energy, a separate charge is required for each pressure wave to be generated. The generation of multiple pressure waves requires a time delay for recharging the device used or requires the use of an array of multiple charges which can be exploded in succession. Further, the pressure wave generated will depend in part on the size of the explosive charge. Some devices can operate with only a charge of limited size, thereby being capable of producing only a limited range of pressure waves in a particular environment.

Pneumatic sources currently being employed use sealed containers which are pressurized with air and then suddenly opened under water to vent the pressurized air into the water. This creates an expanding bubble of air in the water and a resulting pressure wave which is dependent upon the pressure of the air originally within the sealed container. Another pressure wave cannot be generated until the chamber is again sealed and pressurized. This recharging requires a substantial time delay. Also, such devices frequently discharge only when one pressure is reached, thus being capable of producing only one form of pressure wave in a particular environment.

This invention overcomes some of the difficulties encountered in the use of the prior art seismic wave sources by providing an underwater seismic wave source which is capable of continuously flowing varying amounts of pressurized fluid, such as air or water, into the surrounding water, thereby producing an output consisting of continuously varying pressure waves in the surrounding water.

As used herein, a wave means a series of at least three connected alternations. Flow or rate of flow means the volumetric rate of flow of a fluid.

A further advantage of this invention is that the pressure wave output is controlled by a feedback system which enables the operator to obtain the desired output.

Another advantage of this invention is that it is an open system device. That is, the pressurized fluid is expelled from the seismic wave generator into the surrounding water rather than being recycled and stored. This allows fluids, such as air or sea water, to be utilized and eliminates the necessity for employing expensive hydraulic fluid and the like which require cooling and storage equipment. Furthermore, air and sea water are in relatively endless supply to such a seismic wave generator and may be pumped directly from the environment surrounding the seismic wave generator.

The best embodiment of the invention provides an output which, if a gas is employed as the pressurized fluid, will produce small bubbles in the surrounding water, thus reducing the occurrence of the secondary pressure pulses associated with the collapse of large bubbles. This is accomplished by providing a plurality of outlet tubes, each having a small diameter so that the bubbles ejected from these outlet tubes will have a small volume.

SUMMARY OF THE INVENTION

This invention provides a method for generating seismic waves under water which comprises the steps of generating a continuous command signal that varies as a function of time in a predetermined or desired manner, flowing a fluid into the water and varying the flow of the fluid into the water in accordance with variations in the command signal, thereby generating an alternating pressure wave in the water, generating a feedback signal in accordance with the flow of fluid, and controlling the flow of fluid in accordance with a combination of the command and feedback signals.

An apparatus for performing the steps of this method comprises a command signal generator, a motor adapted to be actuated by command signals from the command signal generator, a housing having an inlet and outlet orifice, control means adapted to be actuated by the motor to vary the flow of fluid from the housing, and feedback means adapted to detect changes in the flow of fluid out of the housing and to generate a feedback signal in accordance therewith. The feedback means is connected in order to combine the feedback and command signals to produce a control signal which controls the flow of fluid out of the housing.

Many other objects and advantages will become evident to those skilled in the art upon a reading of the following detailed description and drawings wherein:

FIG. 1 is a schematic drawing of a system for employing the invention;

FIG. 2 is a schematic drawing of one embodiment of the invention;

FIG. 3 is a drawing representing a magnetic tape adapted to be used in one embodiment of this invention;

FIG. 4 is a time plot of a typical signal generated by the magnetic tape shown in FIG. 3;

FIG. 5 is a cross-sectional plan view of an outlet of one embodiment of this invention;

FIG. 6 is a sectional elevational view of a part of another type of seismic wave generator which may be employed in this invention;

FIG. 7 is a sectional elevational view of a part of another type of seismic wave generator which may be employed in this invention; and FIG. 8 shows an alternative position for the pressure transducer employed in one embodiment of this invention.

FIG. 1 shows a system for employing the methods and apparatus of this invention. This system includes a powered boat BT, seismic wave pickups, such as hydrophones or geophones PU, and a submerged seismic wave generator SG. The pickups PU are towed by the boat BT with electrical cable EC1. The boat BT tows the seismic wave generator SG with a tow line TL. Seismic wave generator SG is connected with the control equipment CE by electrical cable EC2. The boat BT carries control equipment CE for generating command signals to actuate the seismic wave generator SG and for receiving and recording signals from the string of seismic wave pickups PU. The boat BT also carries a fluid pump FP, such as an air compressor, which is connected to the seismic wave generator SG by a fluid conduit FC in order to supply pressurized fluid to the seismic wave generator SG.

As the boat BT tows the seismic wave generator SG and the pickups PU through the water, pressurized fluid is supplied to the seismic wave generator SG and command signals are generated by the control equipment CE. The command signals actuate the seismic wave generator SG to release controlled amounts of pressurized fluid into the surrounding water in a predetermined manner, thereby generating pressure waves in the water. These pressure waves produce seismic waves in the earth strata beneath the water. The seismic waves are deflected back through the water towards the surface of the water. Seismic waves resulting from these pressure waves are detected by the seismic wave pickups PU which generate signals in accordance therewith. These signals are returned through seismic cable SC to the control equipment CE where they are recorded.

FIG. 2 shows the best embodiment of the seismic wave source of this invention presently known and various mechanical and electrical components of this embodiment.

CONTROL EQUIPMENT

In the embodiment shown in FIG. 2, a constant drive electric motor 100 is employed to drive a drum 102 which is keyed to drum shaft 104. A magnetic tape 110 is secured to the rotating drum 102. Portions of the magnetic tape 110 are magnetized in order to generate a predetermined command signal when passed near magnetic reproducing or reading head 120. The magnetic reading head 120 consists of an inductance coil which generates an alternating current in accordance with the variations in magnetization of the magnetic tape 110 when the magnetic tape 110 is passed near the reading head 120, as is well known to those skilled in the art.

In FIG. 3. there is shown a magnetic tape 110 which has recorded thereon a recording of a wave which is to be employed to produce a seismic wave of desired characteristics. In the specific embodiment of the invention illustrated, the recording is in the form of a frequency-modulated wave in which the frequency of the wave at any point deviates from a reference or carrier frequency by an amount proportional to the amplitude of the desired seismic wave. The wave itself is indicated only schematically on the magnetic tape 110. A series of such recordings are recorded on the tape 110. As indicated in FIG. 3, each recording extends over a time interval of 3.5 seconds and successive recordings are separated by silent intervals of 3.0 seconds. The actual intervals are determined by the geometry of the system and the speed of operation of the motor 100. The time intervals specified correspond to typical situations. The carrier frequency is very high, such as 10,000 hz., compared with the dominant frequencies of the seismic waves to be produced.

As the drum is rotated in a clockwise direction with the tape 110 mounted on the drum 102 as illustrated in FIG. 2, a frequency-modulated electrical wave is generated in the output of the reproducing head 120. This signal is demodulated by means of a discriminator network 124 in order to produce at its output an electrical copy 124A of the original frequency-modulated signal. In the particular example, this output signal 124A increases in frequency as a function of time as indicated with reference to the increasing time vector 125.

Such a command signal may also be produced in other ways and may vary with time in other ways. For example, if a signal of constant amplitude but increasing frequency is recorded on tape 110, a command signal having an increasing amplitude and frequency may be produced at the output of reading head 120 requiring the use of a low pass filter in place of discriminator 124 in order to obtain a command signal having a constant amplitude and an increasing frequency.

FIG. 4 shows a typical series of command signals 124A, which may be in the form of electrical signals or other physical phenomenon, generated by rotation of the drum 102 near reproducing head 120. A signal 124A of increasing frequency is generated for approximately 3.5 seconds while the magnetic tape 110 passes across the magnetic reading head 120. Then no signal is generated at the output of the discriminator 124 for approximately the next 3.0 seconds while a corresponding part of the magnetic tape 110 passes across the magnetic reading head 120.

Thus, one such signal 124A of approximately 3.5 seconds duration is generated during each 6.5 second interval. As will be described below, this signal will result in a pressure wave having a constant amplitude and an increasing frequency. Of course, the tape 110 may be magnetized in many other ways to produce many other command signals resulting in various types of pressure waves. Such pressure waves may take various forms, such as a wave having a constant amplitude or an alternating wave having a constant frequency.

The electrical command signal 124A which remains after passing through discriminator 124 has a constant amplitude and a frequency which increases as a linear function of time. This is referred to hereinafter as a "chirp" type command signal and the frequency range which will be used herein as an example will be from 20 to 60 hertz. Electrical command signal 124A is a representation of the pressure wave output which is derived from the seismic wave generator SG.

In this system the command signal operates to produce a pressure wave just outside the plenum chamber PC which corresponds to the command signal. This is accomplished in part by the action of a servo motor 140 which has a rotor RO and a stator ST. The command signal 124A is passed through the power amplifier 130 which applies the command signal in amplified form to the stator.

An electrical signal 152A corresponding to the pressure wave is produced by the transducer 154 and after passage through a compensating network 170 and an amplifier 180, the modified signal 180A is applied, along with the command signal 124, to the opposite input sections of a differential amplifier 126. The resultant amplified difference signal 126A is further amplified by a power amplifier 128 to produce an amplified difference signal 126B which is supplied to the rotor RO. With this arrangement the valve is moved inwardly and outwardly as the case may be to cause the amplified signal 180A to match the command signal 124 and hence to control the pressure outside the plenum chamber in a predetermined manner.

Seismic Wave Generator

Seismic wave generator SG consists of a surge chamber SU having an inlet adapted to receive fluid from fluid conduit FC, control valve housing CH, and plenum chamber PC having outlets 148 communicating with the surrounding water. Pressurized fluid from the fluid pump FP is conducted into the surge chamber SU by fluid conduit FC. In the best embodiment of this invention, servo motor 140 in the control valve housing CH is actuated by control signals 126B and command signals 124A. Servo motor 140 controls the position of valve 144 which in turn controls the passage of pressurized fluid from the control valve housing CH into the surrounding water.

The surge chamber SC receives highly pressurized fluid from the fluid pump FP and acts as a safety to guard against imposing unduly high pressures in the rest of the fluid supply system when pressurized fluid backs up in the system due to a sudden restriction between the surge chamber SU and the plenum chamber PC caused by the valve 144.

In this embodiment of this invention, the control valve housing CH houses a servo motor 140 and a valve 144. Valve 144 is connected to servo motor 140 through gearing which acts to move the valve 144 towards and away from the valve seat 146 provided by control valve housing CH. The valve seat 146 is actually a concave annular shoulder of control valve housing CH. Valve 144, actuated by servo motor 140, thus regulates the flow of pressurized fluid from the surge chamber SU to the plenum chamber PC.

As the rate of flow of the fluid varies, the pressure of fluid in the plenum chamber PC and the surrounding water also varies accordingly.

In the best embodiment of this invention, the valve 144 never entirely stops the flow of fluid into the plenum chamber PC while the seismic wave generator SG is under water. This keeps the surrounding water from flowing into the seismic wave generator SG. Thus, the seismic wave generator SG is always operated under water so that the pressure in the plenum chamber PC is maintained slightly above the pressure of the hydrostatic head of the surrounding water. Increased pressurized fluid is supplied to the plenum chamber PC in order to generate the desired pressure waves in accordance with the control signal 126B and command signal 124A.

The plenum chamber PC, shown in FIGS. 2 and 5, is a hollow spherical shell connected at one end to the control valve housing CH in order to receive pressurized fluid therefrom. In the best embodiment of this invention, a series of small diameter outlet tubes 148 are symmetrically positioned around the equator of the plenum chamber PC as outlets for the seismic wave generator SG. Each of these outlet tubes 148 is approximately 6 inches in length and about 1½ inches in diameter. Such a construction provides an outlet for the pressurized fluid which, if the pressurized fluid employed is gas, will reduce the size of the bubbles emitted and diffuse the gas bubbles. This reduces the occurrence of secondary pressure pulses associated with the collapse of large bubbles. Also, the reaction forces generated by the flow of the pressurized fluid from the plenum chamber PC balance each other due to the symmetrical positioning of the outlet tubes 148 so that the underwater parts of the seismic wave generator SG will not be moved laterally by the force of the pressurized fluid being expelled into the surrounding water. In this embodiment of the invention, the outlets 148 are maintained close enough together so that they may all be considered as a single point source from a distance of about 8 feet.

Feedback

A pressure transducer 152, shown in FIG. 2, is secured to the seismic wave generator SG by arm 153. In the best embodiment of the invention, the pressure transducer 152 is located outside of the plenum chamber PC in order to detect changes in pressure in the water adjacent to the plenum chamber PC. Such pressure changes will occur over a period of time as varying amounts of pressurized fluid are emitted from the outlet tubes 148. In this embodiment of the invention, the pressure at the transducer 152 will often be at or above the hydrostatic pressure at the depth of the transducer since the pressure transducer will be removed from any collapsing bubbles and will be at approximately the same depth as the outlets 148.

Pressure transducer 152 is located less than approximately one-eighth of a minimum dominant wave length away from the orifice of the nearest outlet tube 148. Therefore, where a 20 to 60 hertz chirp command signal is employed, the pressure transducer should be located approximately 8 feet away from the orifice of the nearest outlet tube 148.

In the best embodiment of this invention, the pressure transducer 152 is a piezoelectric crystal secured to a housing 154, as shown in FIG. 2. A portion of piezoelectric crystal 152 protrudes from the housing 154 in order that the piezoelectric crystal 152 will be affected by the pressure waves in the surrounding water. Two electrodes (not shown) are secured to two opposite faces of the piezoelectric crystal 152 inside of the housing 154.

The piezoelectric crystal 152 generates an alternating feedback signal 152A when the crystal 152 is subjected to variations in pressure. The signal 152A is passed through the compensating network generally designated as 170, compensates for changes in phase between the signals 126B and 152A and generates signal 170A which is approximately 180° out of phase with command signal 124A over the frequency range employed. Amplifier 180 receives signal 170A and generates amplified feedback signal 180A. Signal 180A is a representation of the pressure wave output of the seismic wave generator SG detected by pressure transducer 152. Signals 124A and 180A are combined by amplifier 126, as is well known in the art, to produce control signal 126A.

Control signal 126A, which is the difference between command signal 124A and feedback signal 180A, drives servo motor 140 to correct for distortions in the system. Thus, control signal 126A corrects for deviations of the detected output pressure wave from the desired output pressure wave.

Operation

A 180° phase shift occurs in an underwater pressure wave when it is reflected from the surface of the water. This phase shift operates to produce a zero net output for the seismic wave generator if the outlet 148 is positioned one-half wave length below the surface of the water. The outlet of the seismic wave generator SG of this invention should therefore be positioned at approximately one-fourth of a minimum wavelength below the surface of the water when in operation.

The wavelength of a pressure wave in water is equal to the velocity of the wave in the water divided by the frequency of the wave. The velocity of a pressure wave in water is approximately 5,000 feet per second. The maximum frequency in the example previously considered was 60 hertz. Therefore, one-fourth of the wavelength is equal to 5,000 divided by (4 × 60). This equals approximately 21 feet which is the depth below the surface of the water at which the outlets 148 of the seismic wave generator SG should be positioned when the seismic wave generator SG is in operation.

First Alternative Embodiment

Another embodiment of the invention employs the apparatus shown and described in U.S. Pat. No. 3,105,671 issued to Bernard R. Teitelbaum and Albert Blatter on Oct. 1, 1963. A modified version of this apparatus is shown in FIG. 6. This apparatus may be employed in place of the seismic wave generator SG described above. U.S. Pat. No. 3,105,671 (herein referred to as the Teitelbaum patent) is hereby incorporated herein by reference in its entirety.

In the device shown in FIG. 6, the electrical signal received by input 22 of torque motor 20 is command signal 124A. The pressure source 44 referred to in the Teitelbaum patent is the high pressure fluid supplied by fluid pump FP and fluid conduit FC referred to above, and shown in FIG. 6. The housing 40 of the Teitelbaum patent is control valve housing CH. Housing 40 of Teitelbaum is extended to enclose torque motor 20, as shown in FIG. 6. The extension of housing 40 provides protection for motor 20 and for its linkage to valve or flapper 36 and to diaphragm 74. Orifice 48 is exposed to the pressure in the surrounding fluid medium by orifice 80 provided in the extension of housing 40.

The chamber 66 in this embodiment corresponds to the plenum chamber PC and the nozzle 70 corresponds to outlet tubes 148 of the previously described embodiments. The feedback system in this alternative embodiment consists of passage 72 which connects chamber 66 to diaphragm 74. Fluid pressure in chamber 66 thereby acts on diaphragm 74 which in turn moves arm 30, through link 76, to resist or to reinforce the force transmitted from motor 20 to valve 36.

As is more fully described in the Teitelbaum patent, in the operation of this embodiment, command signal 124A is received at input 22 by motor 20 and a corresponding torque is applied to arm 24. This rotates arm 30 and, through a mechanical link, valve 36 against the bias of spring 34. Thus, the torque applied to arm 30 by motor 20 becomes a command signal for valve 36. The rotation of arm 30 also moves link 76. The movement of valve 36 away from orifice 42 and towards orifice 48 allows more pressurized fluid to flow into chamber 39, allowing a greater pressure to be developed in chamber 39. The pressure in chamber 39 is transmitted through passage 49 to diaphragm 50. This tends to move valve 52 against the bias of spring 58 and circumferential rim 54 of valve 52 out of contact with valve seat 56. When the pressure on diaphragm 50 is great enough, the seal between rim 54 and valve seat 56 will open, allowing pressurized fluid from the fluid conduit FC to enter the chamber 66 and pass through nozzle 70.

The pressure in chamber 66 is transmitted through passage 72 to diaphragm 74. The force on diaphragm 74 biases arm 30 through link 76. The action of the torque motor 20 on arm 30 must overcome this bias in order to move valve 36. In this manner, a feedback signal is provided which is combined with the command signal, that is, the torque applied by motor 22 to arm 30, to provide a resultant control signal which actuates valve 36. Thus, the pressure transducer 152, compensating network 170, and amplifier 180 are not necessary in this embodiment of the invention.

Second Alternative Embodiment

In a second alternative embodiment of this invention, shown in FIG. 7, a torque motor 20, as described in Teitelbaum, is employed in place of the servo motor 140 previously described. The torque motor 20, in this embodiment, receives control signal 126B, as in the best embodiment of this invention. Signal 126B operates valve 36 as described above under the first alternative embodiment, except that passage 72, diaphragm 74, and link 76 have been omitted.

In this embodiment of the invention, control signal 126B actuates valve 36 without interference from link 76. Feedback is provided by means of pressure transducer 152 located outside of housing 40, as is shown in FIG. 7 and as described above in connection with the best embodiment.

In this alternative embodiment of the invention, when no command signal 124A is being generated, a holding signal (not shown) is supplied to the seismic wave generator SG to maintain a small flow of fluid from the seismic wave generator SG. This keeps the surrounding water from flowing into the seismic wave generator SG.

Alternative Position of Pressure Transducer

In this alternative embodiment, pressure transducer 152 is mounted within the plenum chamber PC in order to detect changes in the pressure within plenum chamber PC. Feedback signal 152A is generated in accordance with the change in pressure in the plenum chamber PC and will correct for deviations of the pressure in the plenum chamber PC from the desired pressure, as previously described.

Similarly, pressure transducer 152 may be mounted in chamber 66 or nozzle 70 of the second alternative embodiment (not shown).

All of the embodiments of the invention herein disclosed have the capability of producing pressure waves in water which have amplitudes or frequencies or both which vary as a function of time. Furthermore, the feedback feature of this invention provides a control feature lacking in the underwater seismic wave sources presently in use. This feedback feature has the advantage of providing pressure waves in the surrounding water which may be made to be almost identical to each other, thus expediting the correlation of these waves. The fact that this invention does not require that pressurized fluid be cooled and stored allows economical operation of the underwater seismic wave source. For example, sea water may be pumped by fluid pump FP directly from the ocean into the control valve housing CH by way of fluid conduit FC.

Although this invention has been described with reference to particular applications, the principles involved are susceptible to numerous other applications which will be apparent to persons skilled in the art and the scope of the invention is not to be limited to the preceding embodiments.

The invention claimed is:

1. A method of generating seismic waves under water for underwater seismic exploration which comprises:
    generating a continuous predetermined command signal that varies as a function of time;
    causing a fluid to flow into the water in accordance with variations of said command signal, thereby generating a varying pressure wave in the water;
    generating a feedback signal in accordance with said flow of fluid; and
    controlling said flow of fluid in accordance with a combination of said command and feedback signals.

2. The method of claim 1 wherein said command signal is generated with a frequency which varies as a function of time.

3. A method of generating seismic waves under water for underwater seismic exploration comprising the steps of:
    immersing a seismic wave generator in a fluid medium;
    generating a predetermined command signal in order to produce a desired pressure wave output;
    generating a pressure wave output in the fluid medium by actuating said seismic wave generator in response to said command signal;
    detecting said pressure wave output;
    generating a feedback signal in accordance with said detected pressure wave output; and
    modifying the actuation of said seismic wave generator in accordance with said feedback signal to produce said desired pressure wave output.

4. The method of claim 3 wherein said generated command signal varies as a function of time and the pressure wave output varies in accordance therewith.

5. The method of claim 3 wherein said pressure wave output is modified by combining said command signal and said feedback signal to produce a control signal which is sued to generate the desired pressure wave output.

6. The method of claim 5 further comprising the steps of:
    pumping water from the surrounding water into said seismic wave generator under pressure; and
    generating a pressure wave in the surrounding water by releasing controlled amounts of said pressurized water from the seismic wave generator into the surrounding water at a rate that varies with the magnitude of said control signal.

7. A method generating seismic waves under water for underwater seismic exploration comprising of steps of:
    Step 1. immersing a seismic wave generator, having an inlet orifice and an outlet orifice, into a fluid medium;
    Step 2. generating a continuous predetermined command signal that varies as a function of time in order to produce a desired pressure wave;
    Step 3. continuously supplying fluid under high pressure to the inlet of said seismic wave generator;
    Step 4. continuously venting said pressurized fluid from the outlet of said seismic wave generator into the fluid medium surrounding the seismic wave generator in response to said command signal, thereby generating a continuously varying pressure wave in said surrounding fluid medium;
    Step 5. continuously detecting changes in the flow of fluid from said seismic wave generator;
    Step 6. generating a feedback signal in accordance with said detected pressure;
    Step 7. combining said feedback signal with said command signal in order to produce a control signal;
    Step 8. generating the desired pressure wave in accordance with said control signal;
    Step 9. maintaining the flow of pressurized fluid from said outlet at all times;
    Step 10. said pressure wave creating seismic waves that travel to portions of the earth from which they are deflected to the surface;
    Step 11. receiving and recording such deflected waves; and
    Step 12. repeating steps 2 through 11.

8. The method of claim 7 wherein step 5 comprises continuously detecting changes in pressure in the fluid medium surrounding the seismic wave generator at a point spaced from said outlet orifice through which the pressurized fluid is vented.

9. The method of claim 7 wherein step 9 comprises reducing the amplitude of said command signal to maintain a small flow of pressurized fluid from said outlet.

10. In a method of generating seismic waves under water for underwater seismic exploration, wherein pressure waves are developed in the water which act on earth strata beneath the water to generate seismic waves which are in turn deflected towards the surface of the water and detected, the steps of:
    immersing a seismic wave generator into the surrounding water;
    moving said seismic wave generator and a seismic wave detector through the water while immersed;
    generating a predetermined command signal that varies as function of time;
    operating a motor within said seismic wave generator in response to a control signal;
    generating a pressure wave in the water in response to the operation of said motor which pressure wave varies in accordance with variations in said control signal;
    detecting said pressure wave in the water adjacent to said seismic wave generator;

generating a feedback signal in accordance with said detected pressure wave;

continuously combining said command signal and said feedback signal in an amplifier to produce said control signal which will generate the desired pressure wave;

detecting seismic waves produced by said pressure wave and deflected from the earth strata beneath the surrounding water with said seismic wave detector; and recording indications of said detected seismic waves.

11. The method of claim 10 wherein said seismic wave generator is submerged to a depth of about 21 feet below the surface of the water.

12. An underwater seismic wave source comprising:

a command signal generator adapted to generate a command signal that varies as a function of time;

motor means driven by said command signal;

a housing having orifice means for passing pressurized fluid into and out of said housing;

control means adapted to be actuated by said motor means to vary the flow of fluid out of said housing; and feedback means adapted to detect changes in the flow of fluid out of said housing and to generate a feedback signal in accordance with said flow, said feedback means being connected to combine said feedback signal with said command signal to produce a control signal whereby said flow of fluid out of said housing varies in accordance with said control signal.

13. An underwater seismic wave source as defined in claim 10 wherein said control means comprises a valve actuated by said motor means and adapted to restrict the flow of fluid out of said housing.

14. An underwater seismic wave source as defined in claim 13 wherein said feedback means further comprises combining means and a transducer, said transducer being positioned outside of said housing at a distance less than about 8 feet from said orifice and being adapted to respond to changes in said flow of fluid out of said housing, said transducer being connected to supply said feedback signal to said combining means in order to combine said command signal and said feedback signal to produce a control signal to drive said motor means.

15. An underwater seismic wave source as defined in claim 13 wherein said feedback means is connected to supply said feedback signal to modify the response of said control means to said motor means.

16. In an underwater seismic wave source having a command signal generator, motor means adapted to be driven by command signals, a housing having an inlet for passing pressurized fluid into said housing and a plurality of outlets for passing pressurized fluid out of said housing, and a valve adapted to drive by said motor means to restrict the flow of fluid out of said housing, the combination therewith of:

a pressure transducer adapted to detect changes in pressure adjacent to said housing outlets and to generate a feedback signal in accordance with said pressure changes, said pressure transducer being connected to supply said feedback signal to control said flow of fluid out of said housing.

17. An underwater seismic wave source comprising:

a command signal generator adapted to continuously generate command signals that vary as a function of time;

a housing having a fluid inlet and a plurality of tubular fluid outlets, said outlets being positioned in close proximity to each other;

valve means positioned in said housing adapted to control the rate of flow from said inlet to said outlets;

motor means connected to said command signal generator adapted to be driven by said command signals to move said valve means into and out of restrictive engagement with said housing in order to vary the flow of fluid through said housing; and a pressure transducer adapted to detect changes in the flow of fluid out of said housing and to generate feedback signals in accordance therewith, said pressure transducer being connected to combine said feedback signals with said command signals to produce control signals, said flow of fluid out of said housing varying in accordance with said control signals.

18. An underwater seismic wave source as defined in claim 17 wherein said motor comprises a servo motor and wherein said pressure transducer is mounted outside of said housing adjacent to said fluid outlets;

said pressure transducer being connected to combine said feedback signals and said command signals to produce control signals for actuating said servo motor.

19. An underwater seismic wave source as defined in claim 17 wherein said pressure transducer is mounted inside of said housing adjacent to said fluid outlets in order to detect the pressure inside of said housing adjacent to said fluid outlets.

20. An underwater seismic wave source as defined in claim 17 wherein said motor comprises a torque motor and said feedback means comprises a pressure transducer mounted inside of said housing adjacent to said fluid outlets;

said pressure transducer being connected to combine said feedback signals and said command signals to produce control signals for actuating said torque motor.

21. An underwater seismic wave source as defined in claim 17 further comprising combining means and wherein said pressure transducer is adapted to detect changes in pressure outside of said housing, adjacent to said outlets and to generate feedback signals in accordance with said pressure, said pressure transducer being connected to supply feedback signals to said combining means in order that said command signals and said feedback signals may be combined to produce control signals to further drive said motor means.

22. An underwater seismic wave source comprising:

a command signal generator adapted to continuously generate command signals that vary in frequency as a function of time;

a housing having a fluid inlet and a fluid outlet;

valve means positioned in said housing adapted to provide a seal between said inlet and said outlet, said housing providing a valve seat for engagement by said valve;

said valve means having an intermediate radially extending flange adapted to engage said valve seat, said valve means being connected to said housing by upper and lower diaphragm sealing means;

means resiliently urging said valve means into restrictive engagement with said valve seat;

said housing having a chamber therein having two closely spaced orifices, one orifice communicating with the outside of the housing and the other communicating with said fluid inlet;

flapper means disposed between said orifices and being adapted to restrict the flow of fluid through one of said orifices at a time;

motor means connected to said command signal generator and adapted to move said flapper means in accordance with command signals received from said generator, thereby controlling pressure in said chamber, said chamber communicating with the outer side of one of said diaphragms to control the position of said valve means connected to said one diaphragm by allowing pressure to be exerted upon said one diaphragm to move said valve against said resilient means and out of engagement with said valve seat; and feedback means adapted to detect changes in pressure adjacent to said housing outlet and to generate feedback signals in accordance therewith, said pressure transducer being connected to modify the movement of said flapper means.

23. An underwater seismic wave source comprising:

a rotating drum;

a magnetic tape secured to said drum, said tape having zones magnetized with a polarity opposite from the polarity of other zones of the tape;

a magnetic tape reading head positioned adjacent to said rotating drum, said reading head being adapted to generate electric command signals in response to the passage of zones of varying magnetization near said reading head;

a housing having a fluid inlet and a plurality of tubular fluid outlets;

a motor mounted in said housing and connected to receive and be driven by said electric command signals;

a valve positioned in said housing adapted to provide a fluid restriction between said fluid inlet and said fluid outlets, said housing providing a valve seat for engagement by said valve;

a surge chamber adapted to receive highly pressurized water pumped from the surrounding water through one end of said surge chamber;

said motor being adapted to move said valve into and out of engagement with said valve seat to release controlled amounts of said pressurized water into the surrounding water;

a plenum chamber positioned between said valve and said outlets; and feedback means secured to said housing and being adapted to detect changes in pressure adjacent to said housing outlets and to generate feedback signals in accordance therewith, said feedback means being connected to modify the flow of pressurized water from said housing in accordance with said feedback signals.

24. The method of claim 7 wherein said changes in the flow of fluid are detected by detecting changes in the pressure of the fluid.

* * * * *